(12) United States Patent
Goutal

(10) Patent No.: US 9,398,047 B2
(45) Date of Patent: Jul. 19, 2016

(54) METHODS AND SYSTEMS FOR PHISHING DETECTION

(71) Applicant: Vade Retro Technology Inc., San Francisco, CA (US)

(72) Inventor: Sebastien Goutal, Cysoing (FR)

(73) Assignee: VADE RETRO TECHNOLOGY, INC., San Francisco, CA (US)

(*) Notice: Subject to any disclaimer, the term of this patent is extended or adjusted under 35 U.S.C. 154(b) by 75 days.

(21) Appl. No.: 14/542,939

(22) Filed: Nov. 17, 2014

(65) Prior Publication Data

US 2016/0142439 A1 May 19, 2016

(51) Int. Cl.
H04L 29/06 (2006.01)

(52) U.S. Cl.
CPC .................................. H04L 63/1483 (2013.01)

(58) Field of Classification Search
CPC .................................................... H04L 63/1483
See application file for complete search history.

(56) References Cited

U.S. PATENT DOCUMENTS

| | | | |
|---|---|---|---|
| 7,422,115 B2 | 9/2008 | Zager et al. | |
| 7,634,810 B2 | 12/2009 | Goodman et al. | |
| 7,668,921 B2 | 2/2010 | Proux | |
| 8,015,598 B2 | 9/2011 | Hird | |
| 8,032,594 B2 | 10/2011 | Helsper et al. | |
| 8,079,087 B1 * | 12/2011 | Spies | G06F 17/30873 709/205 |
| 8,135,790 B1 | 3/2012 | Castelli | |
| 8,141,150 B1 | 3/2012 | Krishnamurthy | |
| 8,209,381 B2 | 6/2012 | Sinn et al. | |
| 8,220,047 B1 | 7/2012 | Soghoian et al. | |
| 8,291,065 B2 | 10/2012 | Goodman et al. | |
| 8,438,462 B2 | 5/2013 | Feng et al. | |
| 8,468,597 B1 * | 6/2013 | Warner | G06Q 10/10 705/50 |
| 8,516,581 B2 | 8/2013 | Hsu et al. | |
| 8,528,079 B2 | 9/2013 | Wang | |
| 8,566,938 B1 | 10/2013 | Prakash et al. | |
| 8,601,586 B1 | 12/2013 | Boutros et al. | |
| 8,621,614 B2 | 12/2013 | Vaithilingam et al. | |
| 8,713,677 B2 | 4/2014 | Soghoian et al. | |
| 8,839,369 B1 | 9/2014 | Dai et al. | |
| 8,839,418 B2 | 9/2014 | Hulten et al. | |
| 8,874,658 B1 | 10/2014 | Khalsa et al. | |

(Continued)

OTHER PUBLICATIONS

International Search Report and Written Opinion of the International Searching Authority dated Mar. 11, 2016 in PCT/US2016/012285.

(Continued)

Primary Examiner — Robert Leung
(74) Attorney, Agent, or Firm — Young Law Firm, P.C.

(57) ABSTRACT

A method of determining a probability that a received email comprises a phishing attempt may comprise analyzing a link therein to determine whether the link comprises a phishing attempt. This determination may comprise comparing features of the link with records stored in a remote database to determine whether the link comprises a phishing attempt. It may be determined that the link comprises a phishing attempt if there is a match. If the compared features do not match the records stored in the remote database, a multi-dimensional input vector may be built from features of the link, which input vector may then be input into a phishing probability engine. The probability that the link comprises a phishing attempt may be computed by the phishing probability engine. Thereafter, the received email may be acted upon according to the computed probability that the link comprises a phishing attempt.

24 Claims, 6 Drawing Sheets

(56) References Cited

U.S. PATENT DOCUMENTS

| | | |
|---|---|---|
| 2005/0086161 A1 | 4/2005 | Gallant |
| 2005/0228899 A1 | 10/2005 | Wendkos et al. |
| 2006/0053293 A1 | 3/2006 | Zager et al. |
| 2006/0075027 A1 | 4/2006 | Zager et al. |
| 2006/0075028 A1 | 4/2006 | Zager et al. |
| 2006/0080735 A1 | 4/2006 | Brinson et al. |
| 2006/0095955 A1 | 5/2006 | Vong et al. |
| 2006/0101120 A1 | 5/2006 | Helsper et al. |
| 2006/0117307 A1* | 6/2006 | Averbuch ............ G06F 17/2247 717/143 |
| 2006/0123464 A1 | 6/2006 | Goodman et al. |
| 2006/0168066 A1 | 7/2006 | Helsper et al. |
| 2007/0033639 A1 | 2/2007 | Goodman et al. |
| 2007/0039038 A1 | 2/2007 | Goodman et al. |
| 2007/0078936 A1* | 4/2007 | Quinlan ............... G06Q 10/107 709/206 |
| 2007/0094500 A1 | 4/2007 | Shannon et al. |
| 2007/0136806 A1 | 6/2007 | Berman |
| 2007/0162366 A1 | 7/2007 | Tanaka et al. |
| 2007/0192855 A1 | 8/2007 | Hulten et al. |
| 2007/0283000 A1 | 12/2007 | Proux |
| 2008/0141342 A1* | 6/2008 | Curnyn ............... H04L 63/0227 726/3 |
| 2008/0177841 A1 | 7/2008 | Sinn et al. |
| 2008/0244715 A1 | 10/2008 | Pedone |
| 2009/0077383 A1 | 3/2009 | de Monseignat et al. |
| 2009/0077637 A1 | 3/2009 | Santos et al. |
| 2009/0089859 A1 | 4/2009 | Cook et al. |
| 2009/0138950 A1 | 5/2009 | Hird |
| 2009/0216795 A1 | 8/2009 | Cohen et al. |
| 2009/0328208 A1 | 12/2009 | Peters |
| 2010/0042687 A1 | 2/2010 | Wang |
| 2010/0043071 A1 | 2/2010 | Wang |
| 2010/0251380 A1* | 9/2010 | Zhang .................... G06F 21/31 726/26 |
| 2010/0306845 A1 | 12/2010 | Vaithilingam et al. |
| 2010/0313266 A1 | 12/2010 | Feng |
| 2011/0035317 A1 | 2/2011 | Carlson et al. |
| 2012/0158626 A1* | 6/2012 | Zhu ..................... H04L 63/1408 706/13 |
| 2012/0259933 A1 | 10/2012 | Bardsley |
| 2013/0086677 A1* | 4/2013 | Ma ..................... G06F 17/3089 726/22 |
| 2013/0145462 A1 | 6/2013 | Hsu et al. |
| 2013/0238721 A1 | 9/2013 | Patel |
| 2014/0041024 A1 | 2/2014 | Larkins |
| 2014/0082521 A1 | 3/2014 | Carolan et al. |
| 2014/0298460 A1* | 10/2014 | Xue .................... H04L 63/1483 726/23 |

OTHER PUBLICATIONS

What is Safe Browsing? Google Developers, downloaded from https://developers.google.com/safe-browsing/ on Nov. 15, 2014.

Wikipedia, Google Safe Browsing, downloaded from http://en.wildpedia.org./wiki/Google_Safe_Browsing on Nov. 15, 2014.

Large-Scale Automatic Classification of Phishing pages, Whittaker, Colin, Ryner, Briand adn Nazif, Marria, downloaded from https://www.isoc.org/isoc/conferences/ndss/10/pdf/08.pdf on Nov. 15, 2014.

SmartScreen Filter: frequently asked questions—Windows Help, downloaded from http://windows.microsoft.com/en-us/windows/smartscreen-filter-faq#1TC=windows-7 on Nov. 15, 2014.

Yandex Safe Browsing API, downloaded from http://api.yandex.com/safebrowsing/ on Nov. 15, 2014.

* cited by examiner

METHODS AND SYSTEMS FOR PHISHING DETECTION

BACKGROUND

Embodiments are related to the detection of phishing Universal Resource Locators (URLs) delivered through electronic messages such as email. Phishing detection refers to the detection of URLs in, for example, emails that purport to be from a legitimate and trustworthy source but that, in fact, do not. Such phishing URLs often are used in attempts to collect personal and financial information from the unsuspecting recipient, often for unauthorized purposes.

The goal of the phisher is most often to capture critical data such as credit card number or login/password credentials. For this purpose, the phisher sends an email to the victim that contains a URL that will lead the victim to a forged website where the victim is induced to enter the sought-after personal and financial information.

DETAILED DESCRIPTION

The user experience is specific to each brand. In order to maximize the capture of critical data in a forged website, the user experience occasioned by viewing and interacting with the phishing email and with the forged website should to be as close as possible to the genuine user experience with a legitimate email and website. For example, a phishing email received by the victim often contain text and graphics—typically, a known and familiar brand logo—to convince the victim to click on a URL link of the forged website and enter his or her credentials therein. Toward that end, the forged website URL often contain keywords that are close to the genuine website URL and the forged website often contains text, style sheets, graphics and user experience that resemble those of the genuine website.

Figure 1:
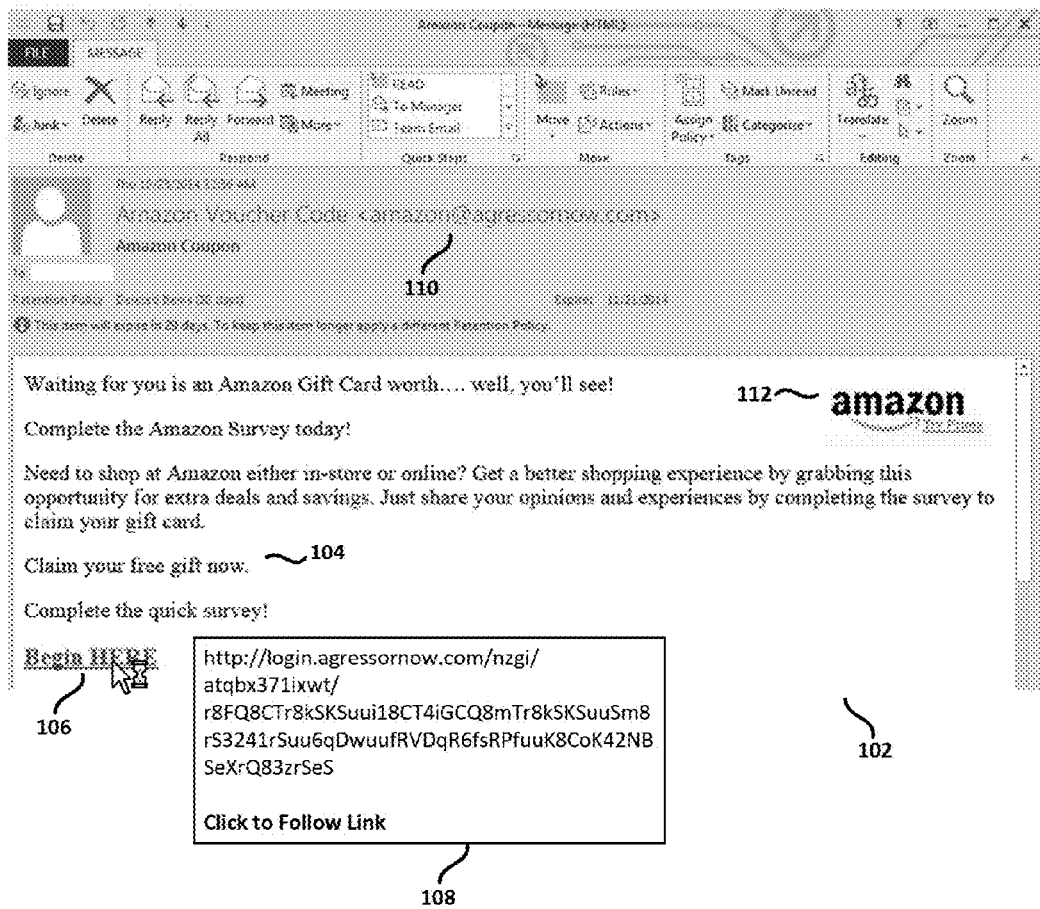
FIG. 1 is a flow chart of a method according to one embodiment.

FIG. 1 shows an example of a phishing email 102. As shown, the email purportedly originates from amazon.com and includes amazon's graphic logo, as shown at 112. The email 102, to the casual observer, appears to originate from amazon.com. Indeed, as shown at 110, the email is titled "Amazon Voucher Code" and the sender appears to be amazon.com as the originator of the email includes the word "amazon": amazon@agressornow.com. Therefore, this email appears to originate from amazon.com, as long as one does not examine what is actually written too carefully. Indeed, the casual and technologically unsophisticated user might be fooled by the word "Amazon" peppered throughout the email.

As shown, the email 102 may include, as shown at 104, prose drafted, with more or less skill, to entice the reader with a special amazon.com promotional deal and to induce the recipient to follow the link as shown at 106. The more careful and discriminating reader may be more skeptical and notice the abundance of exclamation points, poor grammar, spelling, syntax, uncharacteristic familiarity of the prose and/or other tells that would indicate a high probability that this email may not be legitimate. However, even sophisticated users may carelessly click on a link without too much thought, with detrimental results. As shown at 106, the actual URL to which the unsuspecting user will be directed upon clicking the "Begin HERE" link is shown at 108. Had the link 106 been followed, the user would have been directed not to amazon, but to some page on a server hosting the "agressornow.com" domain name, which is wholly unrelated to amazon.com or to any legitimate business purposes.

Figure 2:
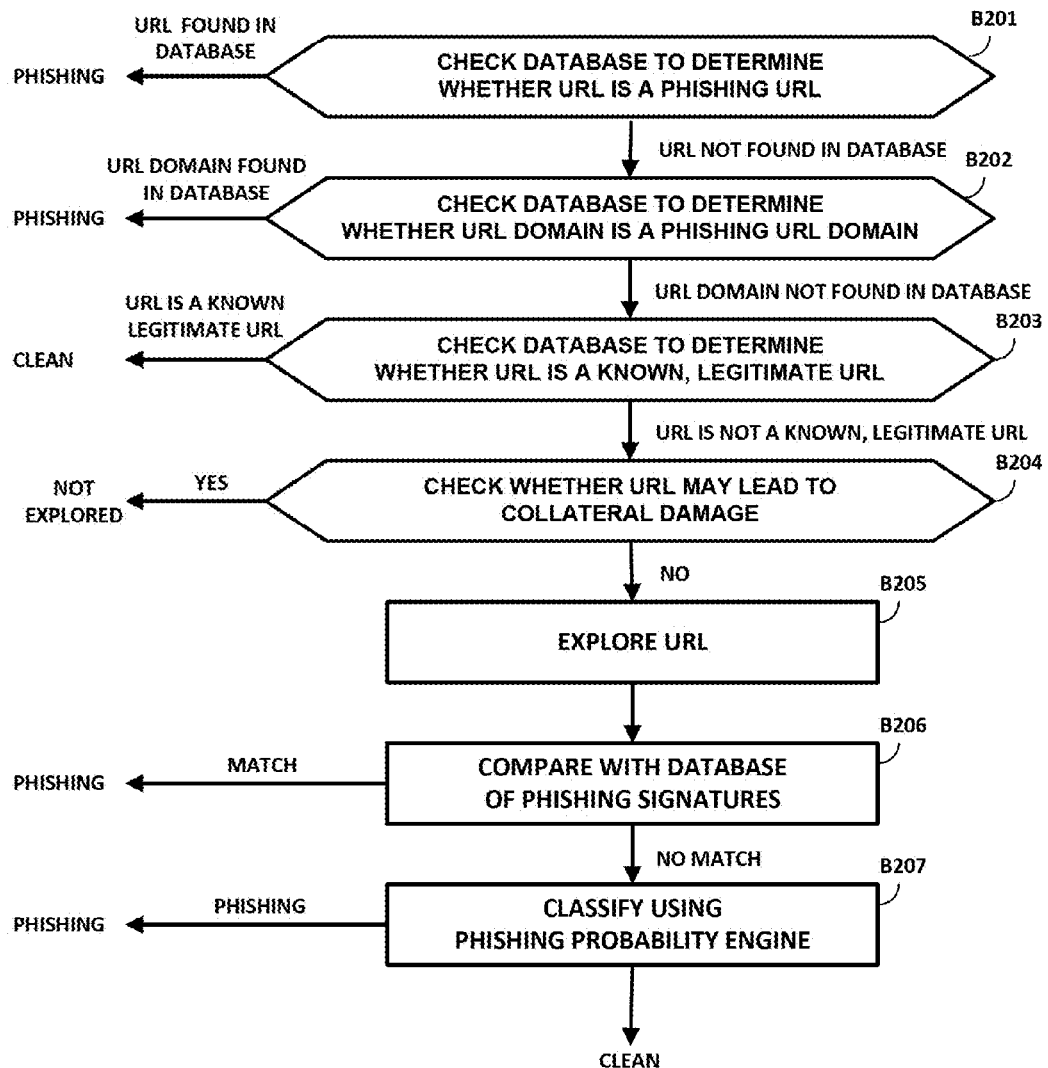
FIG. 2 is a flowchart of a method according to one embodiment.

One embodiment is a method of determining whether a URL is a phishing URL through real-time exploration and analysis that carry out a number of determinations that, in the aggregate, determine the likelihood that a received URL is a phishing URL, as is URL 108 in FIG. 1. FIG. 2 is a flowchart of a method according to one embodiment. The method comprises a plurality of consecutive determinations, any of which may classify the URL as a phishing URL. As shown therein, block B201 calls for checking a database to determine whether the URL under examination is, in fact, a phishing URL. Such a database may have been populated with known phishing URLs (e.g., from prior determinations) and may be accessed over a computer network comprising, for example, the Internet. If the URL is indeed found in the database, the URL may be identified as a phishing URL. If the URL is not found in the database, the method may proceed to block B202, whereupon a database (the same database consulted in block B201 or another database) may be consulted to determine whether the URL domain has been previously identified as a phishing domain URL and been previously stored in the database. If the URL domain (such as "agressornow.com" in the example developed relative to FIG. 1) is found in the database of URL domains, the URL may also be identified as a phishing URL. Therefore, even if the precise URL is not found in the database, the URL may still be identified as a phishing URL by virtue of sharing a domain name with a URL previously identified as a domain name from which phishing URLs originate. If the URL domain is not present in the database, a database (the same database consulted in blocks 201 and/or 202 or another database) may be consulted to determine whether the URL is a known, legitimate URL, as shown at B203. If yes, the URL may be determined to be legitimate. If the URL is not present in the aforementioned database, it may be determined whether it is likely that clicking on or otherwise following the URL may lead to collateral damage. According to one embodiment, collateral damage may be any action by the referenced computer site that may be detrimental to the user. Examples of collateral damage may include, for example, confirming an order, a virus infection, an unsubscribe request, and order confirmation and the like. If collateral damage is suspected or deemed likely, the URL may not be explored and the phishing determination may conclude with or without a determination that the URL is a phishing URL. As shown at B205, if no collateral damage is deemed to be likely, the URL under consideration may be explored, as described in detail hereunder.

The exploration of the URL, as shown at B206, may comprise comparing the URL or a portion or portions thereof with a database (the same or a different database than referred to above) of phishing signatures. Such phishing signatures may comprise, for example, a list of regular expressions that are most often associated with phishing attempts. Such comparison may comprise comparing the content of the webpage pointed to by the URL under consideration with database records of known phishing webpages signatures. A match of such a comparison may result, according to one embodiment, with a determination that the URL is a phishing URL. If no match is found, the method may proceed to block B207. It to be noted, however, that blocks B201-B206 may be carried out in an order that is different than that shown in FIG. 2. Moreover, one or more blocks may be omitted, while additional blocks may be appended, prepending or inserted between the functional blocks shown in FIG. 2, without departing from the present disclosure.

At B207, the URL (which thus far has resisted attempts to classify it as a phishing URL or as a non-phishing URL in previous determinations) may be submitted to a phishing probability engine, the output of which may be interpreted as a probability that the submitted URL under consideration is, in fact, a phishing URL. The probability may be expressed numerically, or may be expressed as a more user-friendly phishing probability rating. For example, the output of the phishing probability engine may comprise ratings such as "Most Likely Not a Phishing URL", "Somewhat Probable Phishing URL" or "Most Likely a Phishing URL" or functionally equivalent ratings with a lesser or greater degree of granularity. According to one embodiment, the phishing probability engine may comprise supervised learning models and associated algorithms to analyze data and recognize patterns. One embodiment utilizes a Support Vector Machine (SVM) classifier on the URL itself and the webpage content.

Figure 3:
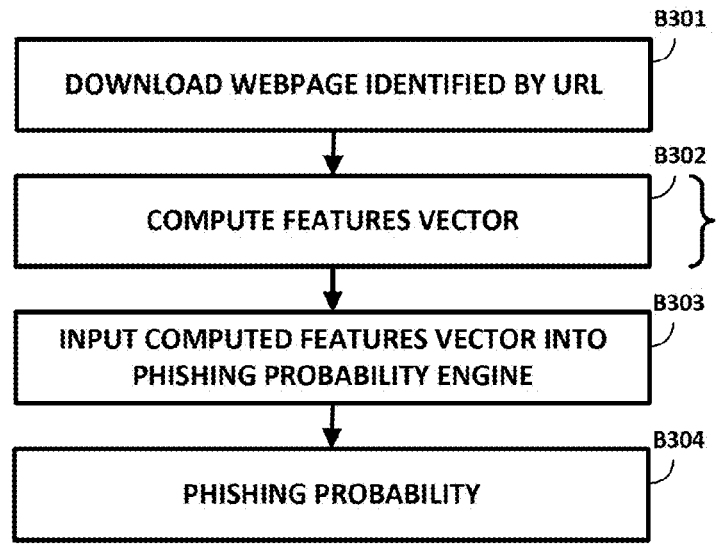
FIG. 3 is a flowchart of a method according to one embodiment.

FIG. 3 is a flowchart of a method of determining whether a URL is likely a phishing URL, according to one embodiment. As shown therein, Block B301 calls for downloading the webpage identified or pointed to by the URL under consideration. Thereafter, an input to the phishing probability engine may be prepared, from the URL and/or the content of the downloaded webpage pointed to by the URL. According to one embodiment, this input to the phishing probability engine may be configured as a features vector, as suggested at block B302. This features vector may then be input into the phishing probability engine as shown at B303, whereupon the phishing probability engine may operate upon the inputted features vector to generate a phishing probability of some form, as shown at B304. The phishing probability may be binary in nature (Phishing Yes or Phishing No) or may output a more fine grained probability, as alluded to above. According to one embodiment, the input to the phishing detection system comprises at least the URL and the output of the phishing system may comprise the probability that the input URL is a phishing URL that should not be trusted or used.

There are a great many well-known brands and each of these brands has separate characteristics, color and font scheme and look and feel. Examples of such brands include, for example, Microsoft, PayPal, Apple or Bank of America. Well-known brands with which users interact frequently are prime candidates for phishing attacks. Rather than extracting features that are common to all brands, one embodiment comprises and accesses a knowledge database of brands configured to enable the present system to extract therefrom items that may be characteristic or specific to each brand.

Brand Elements

According to one embodiment, a brand is identified by a unique name such as Apple, PayPal, Bank of America, Chase or Yahoo. A brand contains a list of elements that defines the knowledge base relative to this brand. According to one embodiment, a knowledge database of brands configured to enable extraction therefrom of items that are characteristic or specific to each brand may include one or more of the following elements:

| Element | Cardinality | Definition |
| --- | --- | --- |
| Keyword | 1 ... n | A keyword is a string that is commonly used in the URL to refer to this brand. For example, mac and itunes are both associated with the apple brand. |
| Domain | 0 ... n | domain is a domain name commonly used to store the genuine brand website or associated files (e.g., pictures, icons, style sheets, scripts). For example, paypal.com and paypalobjects.com are domain names commonly used by the PayPal brand.<br>Note: a forged website may reference files (pictures, icons, style sheets, scripts) that are stored on the genuine brand domains. Thus, if these files are updated, the phisher does not need to update the files on the forged website. |
| Title | 0 ... n | title is a string that may be commonly used in the title of a forged website to refer to the brand. |
| meta_description | 0 ... n | meta_description is a string that may be commonly used in the meta description of a forged website to refer to the brand. |
| phishing_title | 0 ... n | phishing_title is a string that may be commonly used in the title of a forged website to refer to the brand. Whereas title contains a string that may be in the genuine website title, phishing_title contains a string that may not be in the genuine website title. In other words, the phishing probability is much higher if the website title matches phishing_title.<br>For example, a commonly used phishing_title for PayPal is the word PayPal written with uppercase rho Greek letter P instead of uppercase Latin letter P: PayPal |
| css | 0 ... n | css is a cascading style sheet filepath element commonly used by the genuine website of the brand. The filepath element must be relevant: common.css is not relevant as it is used by many websites, whereas myappleid.css is relevant for the Apple brand. |
| js | 0 ... n | js is a JavaScript filepath element commonly used by the genuine website of the brand. The filepath element must be relevant: MyAppleID.js is relevant for the apple brand. |

| Element | Cardinality | Definition |
|---|---|---|
| Icon | 0 . . . n | icon is an icon filepath element commonly used by the genuine website of the brand. The path element must be relevant: favicon.ico is not relevant as it is used by many websites, whereas apple_favicon.gif is relevant for the Apple brand. |
| Data | 0 . . . n | data is a string that is other relevant element of a forged website.<br>For example, RBGLogon string is typical of the Chase brand. |

According to one embodiment, a brand may be defined as a logical construct that includes several elements. Such a logical construct, according to one embodiment, may be implemented as a document type definition (DTD). Other logical constructs may be devised. A DTD is a set of markup declarations that define a document type for an SGML-family markup language (SGML, XML, HTML) and defines the legal building blocks of an XML document. A DTD defines the document structure with a list of legal elements and attributes. A DID that encapsulates a brand, according to one embodiment, may be implemented as an XML file having the following form:

```
<?xml version="1.0" encoding="utf-8"?>
<!DOCTYPE brands [
<!ELEMENT brands (brand+)>
<!ELEMENT brand (keyword+, domain*, title*,
meta_description*,
phishing_title*, css*, js*, icon*, data*)>
<!ATTLIST brand
name CDATA #REQUIRED>
<!ELEMENT keyword (#PCDATA)>
<!ELEMENT domain (#PCDATA)>
<!ELEMENT title (#PCDATA)>
<!ELEMENT meta_description (#PCDATA)>
<!ELEMENT phishing_title (#PCDATA)>
<!ELEMENT css (#PCDATA)>
<!ELEMENT js (#PCDATA)>
<!ELEMENT icon (#PCDATA)>
<!ELEMENT data (#PCDATA)>
]>
```

The following is an exemplary brand description for the Chase bank brand:

```
<brand name="chase">
    <keyword>chase</keyword>
    <domain>chase.com</domain>
    <domain>bankone.com</domain>
    <title>Chase</title>
    <title>CHASE</title>
    <meta_description>Welcome to CHASE, a leading global financial
services firm with operations in more than 60 countries
</meta_description>
    <phishing_title>Chase Online</phishing_title>
    <phishing_title>CHASE Home</phishing_title>
    <phishing_title>Chase Account</phishing_title>
    <css>chase_home_new.css</css>
    <data>RBGLogon</data>
</brand>
```

The following is an exemplary brand description for the Apple brand:

```
<brand name ="apple">
    <keyword>apple</keyword>
    <keyword>itunes</keyword>
    <keyword>itunesconnect</keyword>
    <domain>apple.com</domain>
    <domain>cdn-apple.com</domain>
    <title>Apple</title>
    <title>iTunes</title>
    <phishing_title>iTunes Connect</phishing_title>
    <phishing_title>Mon identifiant Apple</phishing_title>
    <phishing_title>My Apple ID</phishing_title>
    <phishing_title>Apple Store</phishing_title>
    <css>myappleid.css</css>
    <css>hsa.css</css>
    <js>MyAppleID.js</js>
    <icon>apple_favicon.gif</icon>
</brand>
```

Vector Definition

In order to classify a URL as being a legitimate or a suspected phishing URL, one embodiment computes a vector that is suitable to be input to the phishing probability detection engine. One embodiment computes a multi-dimensional vector of binary values, either 0 or 1. One implementation computes a 14-dimensional vector of binary values. Such a vector may be represented by, for example, a 14 bits array. Each dimension (represented by one bit) represents a feature: the bit is set to 1 if the feature condition is met, otherwise the bit is set to 0.

The features of one implementation are shown below, according to one embodiment.

| # | Feature | Description |
|---|---|---|
| 1 | URL_HOSTNAME_IPV4 | The URL hostname is a dot-decimal IPv4 address.<br>Explanation: this is typical of a misconfigured server hacked by a phisher and used to store the forged website. URL shall use a fully qualified domain name (FQDN) and the IP resolution may be carried out by DNS lookup.<br>Example: http://85.25.43.204/itau/ |
| 2 | URL_MANY_SUBDOMAINS | The URL hostname has many (more than five) subdomains.<br>Explanation: this is used to hide the URL domain name that is usually hacked and thus has no connection with the forged brand. |
| 3 | URL_WORDPRESS_PATH_COMPONENT_OR_TILDE | The URL contains WordPress path component (wp-content, wp-admin . . .), another path component that is commonly found in phishing URLs or a tilde (~). |

| # | Feature | Description |
|---|---|---|
| | | WordPress is well known for its software vulnerabilities, as a consequence a lot of servers hacked by phishers are WordPress platforms. Furthermore, there are many misconfigured Unix user accounts, that are represented within the file hierarchy by a tilde (~).<br>Examples:<br>http://data.smartbisnis.co.id/wp-content/dtrade/<br>http://27.120.103.136/~densinno/ |
| 4 | URL_ACTION_KEYWORD_SUSPECT | The URL contains a keyword that is relevant of a required user action within the phishing process (sign in, sign on, log in, log on, verify . . .).<br>Explanation: this is used to lure the user into believing that action is necessary.<br>Ex:<br>http://zgcakes.com/wellsfargo/signon.htm<br>http://213.180.92.216/barclays/login.html?ssl=yes<br>http://paypal.com.verify.webapps.mpp.home-session.com/ |
| 5 | URL_SUBDOMAIN_SUSPECT | One of the URL subdomain element matches a brand.<br>Explanation: this is used to lure the user that the site is legitimate.<br>Ex:<br>http://paypal.com.verify.webapps.mpp.home-session.com/<br>http://support.store.apple.com.id.user.update.apple.com.sylviakosmetik.de/apple/id/lang/en/uk/index.php |
| 6 | URL_PATH_SUSPECT | One of the URL path element matches a brand.<br>Explanation: this is used to lure the user into believing that the site is legitimate.<br>Example:<br>http://www.dog-haus.dp.ua/wp-content/upgrade/paypal/<br>http://93.189.4.34/%7Eadee/bankofamerica.com./login.htm |
| 7 | DOCUMENT_TITLE_OR_METADESCRIPTION_SUSPECT | Webpage title (resp. meta description) matches at least one of the brand title (resp. meta_description) elements. |
| 8 | DOCUMENT_PHISHING_TITLE | Webpage title matches at least one of the brand phishing_title elements. |
| 9 | DOCUMENT_ICON_OR_CSS_OR_JS_SUSPECT | One of the webpage shortcut icon (resp. stylesheet and text/JavaScript) matches at least one of the brand icon (resp. css and js) elements. |
| 10 | DOCUMENT_HIGH_DOMAIN_RATE | At least 50% of webpage links domain match at least one of the brand domain elements. |
| 11 | DOCUMENT_DATA_SUSPECT | One of the webpage data matches at least one of the brand data elements. |
| 12 | DOCUMENT_FORM_SUSPECT | At least one of the html form of the webpage contains a keyword in its attribute that is relevant of a required user action within the phishing process (sign in, sign on, log in, log on, verify . . .).<br>Example:<br><form id="auth-form" action="login.php" method="post" novalidate><br><form method="POST" id="signIn" name="appleConnectForm" action="u-send.php"> |
| 13 | DOCUMENT_CREDENTIAL_FIELD | At least one of the html input field of the webpage is a password input field (input type is password) or a credit card security code (CVC, CVV).<br>Explanation: the purpose of the phishing process is to capture sensitive credentials such as login/password or credit card data.<br>Example<br><input autocomplete="off" type="password" id="login_password" name="login_password" value=""><br><input name="cvc" maxlength="4" id="cvc" autocomplete="off" style="width:47px;" type="text"> |
| 14 | DOCUMENT_PHISHING_PROCESS | The webpage contains evidence that it may have been produced by a phisher. Such evidence may include:<br>html is obfuscated,<br>html source code of the genuine webpage has been downloaded,<br>phisher signature (usually the nickname).<br>Example of html obfuscation:<br>document.write(unescape("\n<!-<br>- %32%6F%66%38%71%77%35%70%64%6A%6C%6D%38%72<br>Example of source code download:<br><!-- saved from<br>url=(0083)https://www.paypal.com/fr/ece/cn=167948368<br>53965869035&em=ajgfdsdfsga@gmail.com&action=4 --><br>Example of phisher signature:<br><!-- All Copyrights to Hadidi44 --> |

As shown in the table below, some of these features are brand-dependent and rely on a brand selection process that will be described further. In the table below, those features having an "X" in the Brand Dependent column are brand-dependent.

| # | Feature | Brand Dependent |
|---|---|---|
| 1 | URL_HOSTNAME_IPV4 | |
| 2 | URL_MANY_SUBDOMAINS | |
| 3 | URL_WORDPRESS_PATH_COMPONENT_OR_TILDE | |
| 4 | URL_ACTION_KEYWORD_SUSPECT | |
| 5 | URL_SUBDOMAIN_SUSPECT | |
| 6 | URL_PATH_SUSPECT | |
| 7 | DOCUMENT_TITLE_OR_METADESCRIPTION_SUSPECT | X |
| 8 | DOCUMENT_PHISHING_TITLE | X |
| 9 | DOCUMENT_ICON_OR_CSS_OR_JS_SUSPECT | X |
| 10 | DOCUMENT_HIGH_DOMAIN_RATE | X |
| 11 | DOCUMENT_DATA_SUSPECT | X |
| 12 | DOCUMENT_FORM_SUSPECT | |
| 13 | DOCUMENT_CREDENTIAL_FIELD | |
| 14 | DOCUMENT_PHISHING_PROCESS | |

Figure 4:
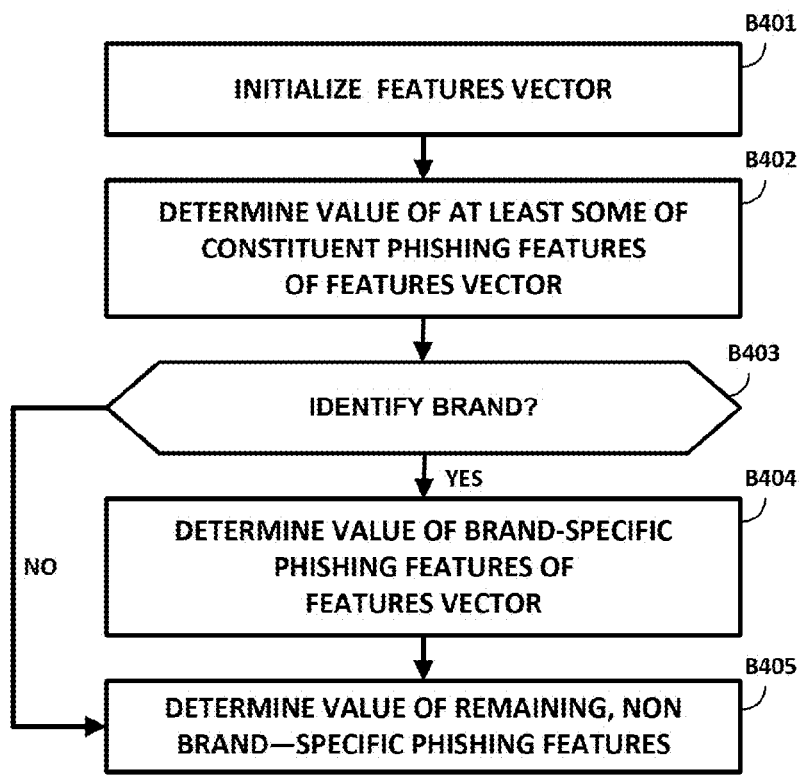
FIG. 4 is a flowchart of a method according to one embodiment.

FIG. 4 is a flow chart of a method of identifying whether a URL is likely a phishing URL, according to one embodiment. As shown at B401, the features vector may be initialized. For example, the value of each feature of the features vector may be set to a given state (such as one or zero). For example, each binary value of the phishing probability vector, each corresponding to one bit, may be initialized to zero. The value of at least some of the features of the features vector may be determined, as called for at B402. That is, analysis of the URL may cause one or more of the constituent bits of the features vector to be set. At B403, it may be determined whether the brand may be identified, from the features vector constructed to date. If the brand can be identified from the features examined thus far, block B505 may be carried out, to determine the value of brand-specific phishing features of the features vector. After the determination of the value of brand-specific phishing features or after it is determined in B403 that the specific brand may not be identified from the examined features, block B405 may be carried out, to determine the value of remaining, non-brand-specific phishing features. This completes the evaluation of the features vector, according to one embodiment. According to one embodiment, this completed features vector may now be input into a phishing probability engine to determine whether the URL under examination is likely to be a phishing URL.

Figure 5:
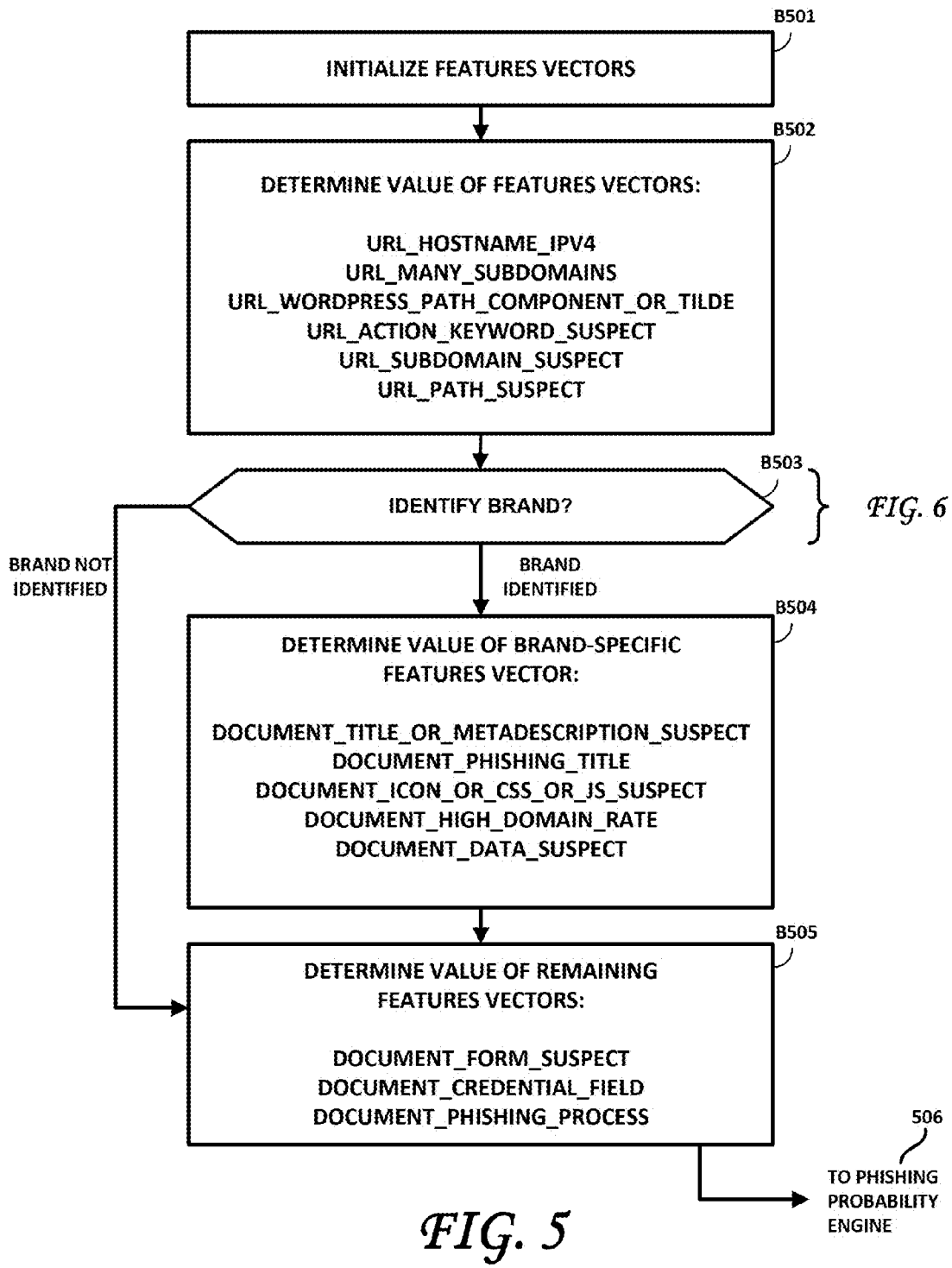
FIG. 5 is a flowchart of a method according to one embodiment.

FIG. 5 is a more detailed flow chart of a method for determining whether a URL is likely a phishing URL, according to one embodiment. This implementation uses the features described above. However, it is to be noted that some of these features may be omitted while other features may be added. Other implementations may use altogether different features to achieve essentially the same functionality.

As shown in FIG. 5, the (in this implementation, 14-bit) features vector may be initialized to, for example, all zeros, as shown at B501. At B502, the value of each of a selected plurality of features vector features may be determined. In one implementation, such selected features vector features may comprise, for example:

URL_HOSTNAME_IPV4
 URL_MANY_SUBDOMAINS
 URL_WORDPRESS_PATH_COMPONENT_OR_TILDE
 URL_ACTION_KEYWORD_SUSPECT
 URL_SUBDOMAIN_SUSPECT
 URL_PATH_SUSPECT

At B503, it may be determine whether the determination of the selected features vector features above is sufficient to enable an identification of the brand that is the subject of the phishing attempt (if such phishing attempt exists). According to one embodiment, the identification of the brand may be carried out according to the method shown and described relative to FIG. 6. If the brand (e.g., Apple, Chase, Bank of America and the like) may be identified, block B504 may be carried out. Otherwise, if the brand may not be identified from the features evaluated thus far, block B505 may be carried out. As shown in B504, a plurality of brand-specific features may be evaluated such as, for example, DOCUMENT_TITLE_OR_METADESCRIPTION_SUSPECT
 DOCUMENT_PIHSHING_TITLE
 DOCUMENT_ICON_OR_CSS_OR_JS_SUSPECT
 DOCUMENT_HIGH_DOMAIN_RATE
 DOCUMENT_DATA_SUSPECT After the determination of the value of brand-specific phishing features or after it is determined in B504 that the specific brand may not be identified from the examined features, block B505 may be carried out, to determine the value of remaining, non-brand-specific phishing features such as, for example:

DOCUMENT_FORM_SUSPECT
 DOCUMENT_CREDENTIAL_FIELD
 DOCUMENT_PHISHING_PROCESS

The resultant features vector may now be input to the phishing probability engine, as shown at 506.

Figure 6:
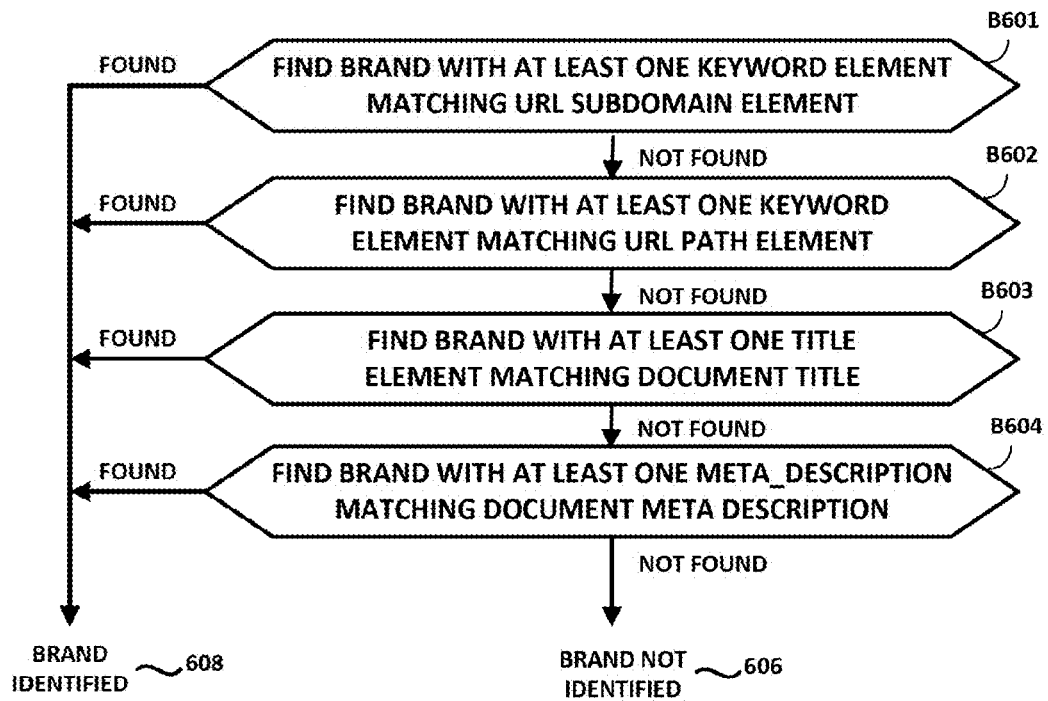
FIG. 6 is a flowchart of a method of identifying a brand, according to one embodiment.

A brand identification algorithm according to one embodiment is shown in FIG. 6. As shown therein, the brand identification algorithm may include an iterative process, whereby selected features are evaluated in turn to determine whether the brand may be identified. According to one embodiment, if any one of the evaluated features match a corresponding element in the phishing database, the brand may be considered to have been identified. According to one embodiment, more than one matching feature may be required before a brand may have been considered to have been identified, as shown at 608. In the flow chart of FIG. 6, the brand database(s) is searched to find one or more keyword elements matching a URL subdomain element, as shown at B601. If such a keyword element matching a URL subdomain element is found, the brand may be identified, as shown at 608. If not, the method may proceed to match one or more other database records. For example, B602 calls for finding a brand with one or more keyword element that matches a URL path element. If such a match is found, the brand may be identified, as shown at 608. Otherwise, the database may be searched for other matches. For example, block B603 calls for finding a match with one or more title elements that match a document title. If such a matching title element is found, the brand may be identified, as shown at 608. If no matching title element is found at B603, one or more other matches may be attempted. For example, block B604 calls for matching at least one meta description in the database that matches a document meta description. If a match is found, the brand is identified. If not, other matches may be attempted or the brand may be declared to be unknown, as shown at 606.

The following phishing URL example uses the Chase brand name, for exemplary purposes only.

http://tula-tur.ru/chase/chase_auth.html

Examination of this phishing URL, according to one embodiment, would lead to a brand identification of Chase, as Chase is a keyword element matching URL path element at B602 in FIG. 6.

http://itunes.menaiswimclub.org.au/images/confirm

This phishing link leads to a brand identification of Apple as itunes is a keyword element matching URL subdomain element at B601 in FIG. 6.

Compute Phishing Probability with SVM Classifier

The computed input vector may now be input to phishing probability engine. According to one embodiment, the phishing probability engine may comprise a Support Vector Machine (SVM) classifier. One embodiment of the phishing probability engine uses a binary SVM classifier, in which the two classes N and P are N: the class of non-phishing elements, and P: the class of phishing elements.

Herein, an element is a pair of two files. According to one embodiment, the first file of the pair of files of the element is a URL file, containing the URL under investigation. The second file of the pair of files of the element is an HTML file containing the webpage pointed to by the URL. According to one implementation, the filename of the first file is a hash of, for example, a quantity such as the current timestamp and the URL under investigation. The extension of the first file may be, for example, ".url". Similarly, the filename of the second file may be a hash of, for example, a quantity such as the current timestamp and the content of the webpage pointed to by the link (e.g., URL) in the email. The extension of the second file may be, for example, ".html". According to one embodiment, the hash may be a message digest algorithm such as an MD5 hash, although other hashes may be utilized as well. For example, the two files may be named as follows:

033d6ac75c84e3700b583ce9529de8f1.url
033d6ac75c84e3700b583ce9529de8f1.html

To train the SVM classifier, it may be provided with a corpus of P (phishing elements) and N (non-phishing) elements. This corpus may be updated periodically as new phishing attempts are discovered, to follow the phishing trend. The training and testing of the SVM classifier produces a SVM model that may be used by the phishing probability engine.

According to one embodiment, for an input vector V (e.g., the 14-dimensional input vector discussed herein), the SVM classifier of the phishing probability engine produces a probability: the probability that input vector V belongs to the P class, the class of phishing elements. This probability may then be used to decide whether the URL under investigation is likely a phishing URL. Subsequently, actions such as deleting, guaranteeing or placing an email in a "Junk" folder, may be carried out, based upon the computed probability.

Figure 7:
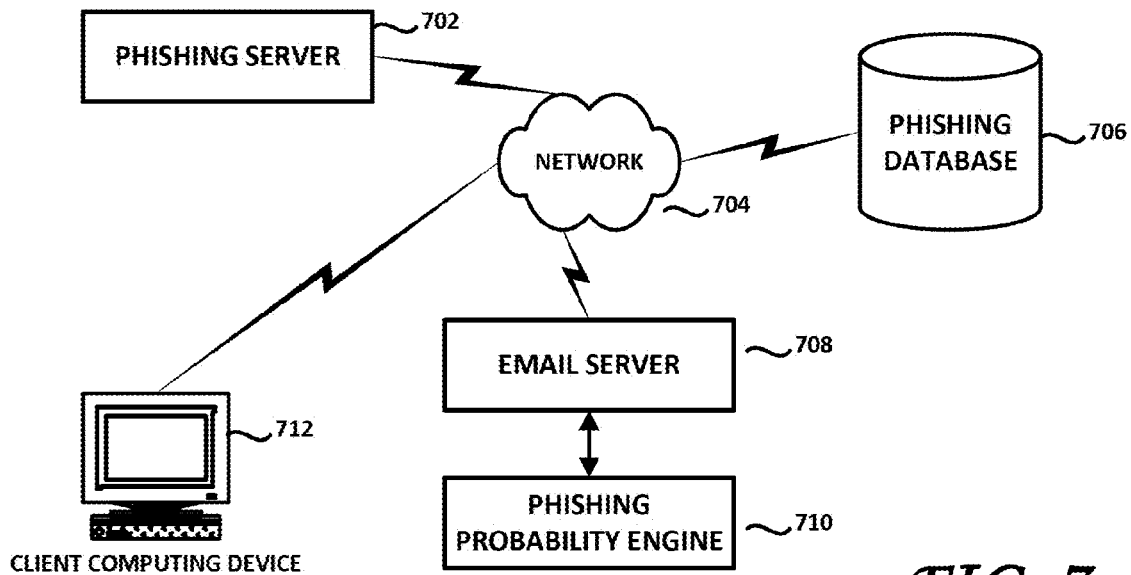
FIG. 7 is a block diagram of a system configured to detect phishing attempts, according to one embodiment.

FIG. 7 is a block diagram of a system configured for phishing detection, according to one embodiment. As shown therein, a phishing email server 702 (not part of the phishing detection system, per se) may be coupled to a network (including, for example, the Internet), and to a client computing device 712's email server 708. The email server 708 may be configured to receive the email on behalf of the client computing device 712 and provide access thereto. A phishing database 706 may also be coupled to the network 704 and may be configured to store the logical constructs that define brands. According to one embodiment, such logical constructs may be configured as document type definitions (DTDs, as set out in detail above). A phishing probability engine 710 may be coupled to or incorporated within, the email server 708. Alternatively, some or all of the functionality of the phishing probability engine 710 may be coupled to or incorporated within the client computing device 712. Alternatively still, the functionality of the phishing probability engine 710 may be distributed across both client computing device 712 and the email server 708. Similarly, the input vector (e.g., the 14-bit input vector to the phishing probability engine 710) may be constructed at the email server 708 through accesses to the phishing database 706 and/or by the client computing device 712 (the ultimate intended recipient of the email under evaluation).

Figure 8:
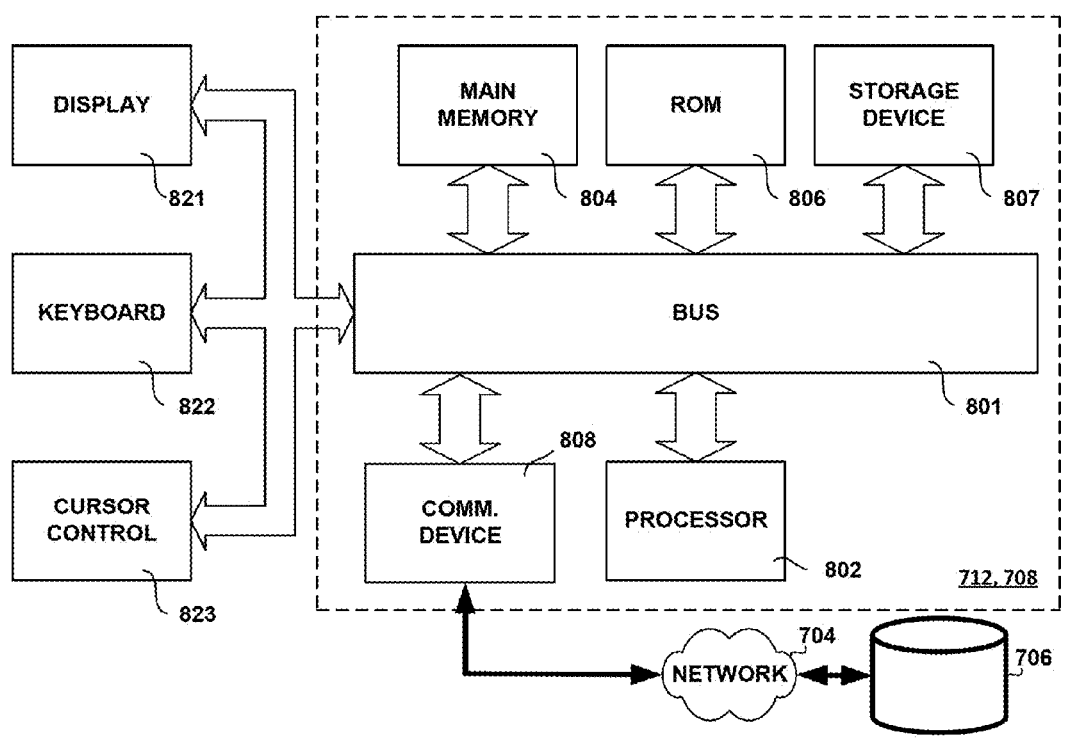
FIG. 8 is a block diagram of a computing device according to one embodiment.

FIG. 8 illustrates a block diagram of a computing device 712, 708 upon and with which embodiments may be implemented. Computing device 712, 708 may include a bus 801 or other communication mechanism for communicating information, and one or more processors 802 coupled with bus 801 for processing information. Computing device 712, 708 may further comprise a random access memory (RAM) or other dynamic storage device 804 (referred to as main memory), coupled to bus 801 for storing information and instructions to be executed by processor(s) 802. Main memory 804 also may be used for storing temporary variables or other intermediate information during execution of instructions by processor 802. Computing device 712, 708 also may include a read only memory (ROM) and/or other static storage device 806 coupled to bus 801 for storing static information and instructions for processor(s) 802. A data storage device 807, such as a magnetic disk or solid state data storage device may be coupled to bus 801 for storing information and instructions. The computing device 712, 708 may also be coupled via the bus 801 to a display device 821 for displaying information to a computer user. An alphanumeric input device 822, including alphanumeric and other keys, may be coupled to bus 801 for communicating information and command selections to processor(s) 802. Another type of user input device is cursor control 823, such as a mouse, a trackball, or cursor direction keys for communicating direction information and command selections to processor(s) 802 and for controlling cursor movement on display 821. The computing device 712, 708 may be coupled, via a communication device (e.g., modem, NIC) to a network 704 and to the database(s) 706 configured to store the brand DTDs, according to one embodiment.

Embodiments of the present invention are related to the use of computing device 712, 708 to detect and compute a probability that received email contains a phishing URL. According to one embodiment, the methods and systems described herein may be provided by one or more computing devices 712, 708 in response to processor(s) 802 executing sequences of instructions contained in memory 804. Such instructions may be read into memory 804 from another computer-readable medium, such as data storage device 807. Execution of the sequences of instructions contained in memory 804 causes processor(s) 802 to perform the steps and have the functionality described herein. In alternative embodiments, hard-wired circuitry may be used in place of or in combination with software instructions to implement the described embodiments. Thus, embodiments are not limited to any specific combination of hardware circuitry and software. Indeed, it should be understood by those skilled in the art that any suitable computer system may implement the functionality described herein. The computing devices may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a nonvolatile semiconductor memory external to the microprocessor, or integrated with the microprocessor. In another embodiment, the instructions may be stored on a disk and read into a volatile semiconductor memory before execution by the microprocessor.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A method of determining a probability that a received email comprises a phishing attempt, comprising:
   receiving an email,
   analyzing a link within the email to determine whether the link comprises a phishing attempt by:
      comparing at least some features of the link with records stored in a remote database to determine whether the link comprises a phishing attempt and determining that the link comprises a phishing attempt if the compared features match the records stored in the remote database;
      building a multi-dimensional input vector from at least features of the link if the compared features do not match the records stored in the remote database and evaluating a plurality of the features of the link to set or reset at least one bit of the multi-dimensional input vector;
      inputting the built multi-dimensional input vector into a phishing probability engine;
      computing, in the phishing probability engine, a probability that the link comprises a phishing attempt; and
      acting upon the received email depending upon the computed probability that the link comprises a phishing attempt.

2. The method of claim 1, wherein the link comprises a Uniform Resource Locator (URL).

3. The method of claim 1, wherein the features of the link comprise at least one of a domain name, a subdomain name, a path, a symbol, a keyword, a document title and a meta description.

4. The method of claim 1, wherein at least some of the compared features are brand-specific and at least some of the compared features are not brand-specific.

5. The method of claim 1, wherein building comprises building the multi-dimensional input vector from the features of the link and from content of the webpage pointed to by the link.

6. The method of claim 1, wherein the phishing probability engine comprises a Support Vector Machine (SVM) classifier.

7. The method of claim 6, further comprising training the SVM classifier with a corpus of non-phishing elements and phishing elements to generate a SVM model that is configured to be used by the phishing probability engine.

8. The method of claim 7, wherein the corpus comprises elements that comprise a first file that comprises a hash of the link and a selected quantity and a second file that comprises a hash of contents of a webpage pointed to by the link and the selected quantity.

9. The method of claim 8, wherein the hash comprises a message digest algorithm.

10. The method of claim 1, further comprising attempting to identify a brand that is a focus of at least one of the received email and the link.

11. The method of claim 1, wherein comparing is carried out with the remote database storing a plurality of records, each of which comprising a logical construct that defines a brand.

12. The method of claim 10, wherein the logical construct is formatted as a Document Type Definition (DTD).

13. A computing device configured to determine a probability that a received email comprises a phishing attempt, comprising:
   at least one processor;
   at least one data storage device coupled to the at least one processor;
   a plurality of processes spawned by said at least one processor, the processes including processing logic for:
   receiving an email,
   analyzing a link within the email to determine whether the link comprises a phishing attempt by:
      comparing at least some features of the link with records stored in a remote database to determine whether the link comprises a phishing attempt and determining that the link comprises a phishing attempt if the compared features match the records stored in the remote database;
      building a multi-dimensional input vector from at least features of the link if the compared features do not match the records stored in the remote database and evaluating a plurality of the features of the link to set or reset at least one bit of the multi-dimensional input vector;
      inputting the built multi-dimensional input vector into a phishing probability engine;
      computing, in the phishing probability engine, a probability that the link comprises a phishing attempt; and
      acting upon the received email depending upon the computed probability that the link comprises a phishing attempt.

14. The computing device of claim 13, wherein the link comprises a Uniform Resource Locator (URL).

15. The computing device of claim 13, wherein the features of the link comprise at least one of a domain name, a subdomain name, a path, a symbol, a keyword, a document title and a meta description.

16. The computing device of claim 13, wherein at least some of the compared features are brand-specific and at least some of the compared features are not brand-specific.

17. The computing device of claim 13, further comprising processing logic for building the multi-dimensional input vector from the features of the link and from content of the webpage pointed to by the link.

18. The computing device of claim 13, wherein the phishing probability engine comprises a Support Vector Machine (SVM) classifier.

19. The computing device of claim 18, further comprising processing logic for training the SVM classifier with a corpus of non-phishing elements and phishing elements to generate a SVM model that is configured to be used by the phishing probability engine.

20. The computing device of claim 19, wherein the corpus comprises elements that comprise a first file that comprises a hash of the link and a selected quantity and a second file that comprises a hash of contents of a webpage pointed to by the link and the selected quantity.

21. The computing device of claim 20, wherein the hash comprises a message digest algorithm.

22. The computing device of claim 13, further comprising processing logic for attempting to identify a brand that is a focus of at least one of the received email and the link.

23. The computing device of claim 13, wherein the remote database stores a plurality of records, each of which comprising a logical construct that defines a brand.

24. The computing device of claim 23, wherein the logical construct is formatted as a Document Type Definition (DTD).

* * * * *